United States Patent
Asakura et al.

(10) Patent No.: US 10,012,264 B2
(45) Date of Patent: Jul. 3, 2018

(54) SLIDING MEMBER

(71) Applicant: DAIDO METAL COMPANY LTD., Nagoya-shi, Aichi (JP)

(72) Inventors: Hiroyuki Asakura, Inuyama (JP); Mikihito Yasui, Inuyama (JP); Shigeya Haneda, Inuyama (JP)

(73) Assignee: Daido Metal Company Ltd., Nagoya (JP)

(*) Notice: Subject to any disclaimer, the term of this patent is extended or adjusted under 35 U.S.C. 154(b) by 754 days.

(21) Appl. No.: 14/384,909

(22) PCT Filed: Feb. 7, 2013

(86) PCT No.: PCT/JP2013/052871
§ 371 (c)(1),
(2) Date: Sep. 12, 2014

(87) PCT Pub. No.: WO2013/140883
PCT Pub. Date: Sep. 26, 2013

(65) Prior Publication Data
US 2015/0016766 A1 Jan. 15, 2015

(30) Foreign Application Priority Data
Mar. 23, 2012 (JP) ................. 2012-067207

(51) Int. Cl.
*B32B 15/08* (2006.01)
*F16C 33/00* (2006.01)
(Continued)

(52) U.S. Cl.
CPC ............ *F16C 33/205* (2013.01); *B32B 15/08* (2013.01); *C22C 11/00* (2013.01); *C22C 11/04* (2013.01);
(Continued)

(58) Field of Classification Search
USPC ......................................................... 428/626
See application file for complete search history.

(56) References Cited

U.S. PATENT DOCUMENTS

2003/0111511 A1   6/2003   Kanayama et al.
2003/0134141 A1*  7/2003   Okado ..................... F16C 5/00
                                                    428/626
(Continued)

FOREIGN PATENT DOCUMENTS

EP     1522750 A1 *  4/2005   ............. B32B 15/01
GB     2 337 306      11/1999
(Continued)

OTHER PUBLICATIONS

Allenden, Charles, "Metal Hardness: How to Measure It and Why It Matters for Silver Alloys", Nov. 1, 2012, <http://riograndeblog.com/2012/11/metal-hardness-how-to-measure-it-and-why-it-matters-for-silyer-alloys/>, accessed May 29, 2015.*
(Continued)

*Primary Examiner* — Humera N Sheikh
*Assistant Examiner* — Xiaobei Wang
(74) *Attorney, Agent, or Firm* — Snyder, Clark, Lesch & Chung, LLP

(57) ABSTRACT

There is provided a sliding member formed by combining a resin overlay and a soft metal overlay. The sliding member has a soft layer comprising a metallic material with a hardness of less than 40 HV provided under a resin overlay layer comprising a solid lubricant and resin. In the event of contamination by a foreign matter, the soft layer under the resin overlay layer is capable of plastic deformation and the resin overlay layer is capable of partial deformation accompanying the plastic deformation due to the hardness (T1) (μm) of the soft layer and the hardness (T2) (μm) of the resin overlay layer being such that 0.2≤T1/T2≤7.0 and 3.0≤T1≤20.0. Consequently, a foreign matter is desirably
(Continued)

embedded and resistance to a foreign matter can be improved. Low friction is maintained by the resin overlay layer even after contamination by a foreign matter.

4 Claims, 1 Drawing Sheet

(51) Int. Cl.
*F16C 33/20* (2006.01)
*C22C 11/00* (2006.01)
*C22C 11/06* (2006.01)
*C22C 12/00* (2006.01)
*C22C 11/04* (2006.01)
*C22C 13/00* (2006.01)
*C22C 1/10* (2006.01)

(52) U.S. Cl.
CPC .............. *C22C 11/06* (2013.01); *C22C 12/00* (2013.01); *C22C 13/00* (2013.01); *F16C 33/201* (2013.01); *F16C 33/206* (2013.01); *B32B 2307/558* (2013.01); *B32B 2307/746* (2013.01); *C22C 1/10* (2013.01); *F16C 2202/04* (2013.01); *F16C 2208/58* (2013.01); *F16C 2240/54* (2013.01); *F16C 2240/60* (2013.01)

(56) References Cited

U.S. PATENT DOCUMENTS

| | | | | |
|---|---|---|---|---|
| 2004/0052438 | A1* | 3/2004 | Sugita | ........................ F16C 3/06 |
| | | | | 384/430 |
| 2009/0233120 | A1* | 9/2009 | Maruyama et al. | .......... 428/612 |
| 2012/0009385 | A1* | 1/2012 | Satou et al. | .................. 428/141 |
| 2012/0251023 | A1* | 10/2012 | Gaertner | ............... C23C 14/046 |
| | | | | 384/276 |

FOREIGN PATENT DOCUMENTS

| | | | | |
|---|---|---|---|---|
| GB | 2337306 | * | 11/1999 | ............. F16C 33/20 |
| JP | H07238936 | A | 9/1995 | |
| JP | H11325077 | A | 11/1999 | |
| JP | 2004211859 | A | 7/2004 | |
| JP | 2006283905 | A | 10/2006 | |
| JP | 2008014454 | A | 1/2008 | |
| WO | WO-2002075172 | A1 | 9/2002 | |

OTHER PUBLICATIONS

Office Action dated Jun. 14, 2016 in corresponding German Application No. 11 2013 001639.7.

International Search Report (in Japanese with English Translation) for PCT/JP2013/052871, dated May 14, 2013; ISA/JP.

* cited by examiner

SLIDING MEMBER

CROSS REFERENCE TO RELATED APPLICATIONS

This application is a U.S. National Phase Application under 35 U.S.C. 371 of International Application No. PCT/JP2013/052871 filed on Feb. 7, 2013 and published in Japanese as WO 2013/140883 A1 on Sep. 26, 2013. This application is based on and claims the benefit of priority from Japanese Patent Application No. 2012-067207 filed on Mar. 23, 2012. The entire disclosures of all of the above applications are incorporated herein by reference.

TECHNICAL FIELD

The present invention relates to a sliding member having a resin overlay formed from a solid lubricant and a resin, and relates to a sliding member favorable as a slide bearing and a bush for an internal combustion engine, for example.

BACKGROUND ART

Conventionally, as a surface layer in a sliding surface of a sliding member, metal overlays and resin overlays have been proposed. The resin overlays are manufactured from a synthetic resin with low friction, and are excellent in low friction as compared with a metal overlay. Further, for example, in JP-A-07-238936 (Patent Literature 1), the seizure resistance of a sliding member is improved by specifying roughness, composition and thickness of a resin overlay that is formed on an Al-base bearing alloy, whereas in JP-A-2006-283905 (Patent Literature 2), an Al—Sn alloy overlay by sputtering is adopted as an underlying alloy of a resin overlay, and the Al—Sn alloy overlay has a Vickers' Hardness of 40 to 100, whereby conformability at the time of uneven contact (or misalignment) of the bearing member is improved.

CITATION LIST

Patent Literature

PATENT LITERATURE 1: JP-A-07-238936
PATENT LITERATURE 2: JP-A-2006-283905

SUMMARY OF INVENTION

Technical Problem

However, the resin overlays as in cited literatures 1 and 2 elastically deform by an external force, and therefore it is feared that the resin overlays are inferior in conformability of sliding members, in particular, resistance to a foreign matter, as compared with a metal overlay. Further, in recent years, output power of engines has increased, and in order to improve the performance at the time of commingling of a foreign matter, which is not avoidable in view of the use environments of the engines, further improvement in conformability is required while using resin overlays. Under the circumstances as above, study for combining a metal overlay and a resin overlay has been hardly advanced. The present invention is made in the light of the circumstances described above, and an object of the present invention is to provide a sliding member that can be improved in resistance to a foreign matter while utilizing low friction of a resin overlay, by combining the resin overlay and a soft metal overlay.

Solution to Problem

In order to solve the above described problem, the invention according to claim 1 provides a sliding member having a resin overlay layer formed from a solid lubricant and a resin, including a soft layer formed from a metallic material with a hardness of less than 40 HV under the resin overlay layer, wherein the relationship of a thickness $T1$ (μm) of the soft layer and a thickness $T2$ (μm) of the resin overlay layer satisfies $0.2 \leq T1/T2 \leq 7.0$, and $3.0 \leq T1 \leq 20.0$.

The invention according to claim 2 provides the sliding member according to claim 1, wherein the relationship of a roughness $Ra(b)$ at an interface of the soft layer and the resin overlay layer with the thickness $T1$ of the soft layer satisfies $Ra(b) \leq T1 \times 0.06$.

The invention according to claim 3 provides the sliding member according to claim 1 or claim 2, wherein a detection value of an oxygen amount at an interface of the soft layer and the resin overlay layer is 0.3 V or less, in GD-OES analysis.

Advantageous Effects of Invention

The invention according to claim 1 has the soft layer formed from a metallic material with a hardness of less than 40 HV under the resin overlay layer, wherein the relationship of a thickness $T1$ (μm) of the soft layer and a thickness $T2$ (μm) of the resin overlay layer satisfies $0.2 \leq T1/T2 \leq 7.0$, and $3.0 \leq T1 \leq 20.0$, whereby at the time of commingling of a foreign matter, the soft layer formed from the metallic material under the resin overlay layer plastically deforms, and the resin overlay layer can partially deform in such a manner as to accompany the plastic deformation. Therefore, the foreign matter is favorably embedded, and resistance to a foreign matter can be improved. Further, even after contamination with the foreign matter, the resin overlay layer can maintain low friction. According to the configuration like this, the surface contour of the layer under the resin overlay layer does not have to be specially taken into consideration, which is advantageous in terms of management and manufacture. Note that the hardness of the soft layer formed from a metallic material is more preferably 20 HV or lower.

Note that the resin overlay layer disclosed in Patent Literature 2 is formed on a relatively hard metallic material that is an AL—Sn alloy overlay having a Vickers' hardness of 40 to 100, and at the time of commingling of a foreign matter, the layer under the resin overlay layer does not plastically deforms so that elastic deformation of the resin overlay layer having a sliding surface becomes dominant, and therefore, favorable resistance to a foreign matter cannot be obtained under severe environments.

Further, while the relationship of the thickness $T1$ (μm) of the soft layer and the thickness $T2$ (μm) of the resin overlay layer satisfies $0.2 \leq T1/T2 \leq 7.0$, and $3.0 \leq T1 \leq 20.0$, if $T1/T2$ is less than 0.2, the thickness $T1$ (μm) of the soft layer with respect to the thickness $T2$ (μm) of the resin overlay layer is small, and even if the soft layer plastically deforms at the time of commingling of a foreign matter, deformation of the resin overlay layer is so small that the foreign matter cannot be favorably embedded. Meanwhile, if $T1/T2$ exceeds 7, the thickness $T1$ (μm) of the soft layer with respect to the thickness $T2$ (μm) of the resin overlay layer is large, and at the time of embedding the foreign matter, deformation of the resin overlay layer becomes so large that trouble in which a crack occurs in the resin overlay layer itself or at the interface with the soft layer easily occurs. Note that the relationship of the thickness T1 (μm) of the soft layer and the thickness T2 (μm) of the resin overlay layer is more preferably $2.0 \leq T1/T2 \leq 7.0$.

Further, it has been confirmed that more favorable resistance to a foreign matter is exhibited by the relationship of the roughness Ra(b) at the interface of the soft layer and the resin overlay layer with the thickness T1 of the soft layer satisfying $Ra(b) \leq T1 \times 0.06$, as in the invention according to claim 2. It is conceivable that with $Ra(b) \leq T1 \times 0.06$, the roughness at the interface of the soft layer and the resin overlay layer is fine, the resin overlay layer hardly receives stress locally when the soft layer formed from a metallic material plastically deforms, fracture of the resin overlay layer is restrained, and favorable resistance to a foreign matter can be exhibited. Further, as the thickness T1 of the soft layer becomes larger, the stress that is generated when the soft layer plastically deforms can be easily released to the thickness direction of the soft layer (on an underlying alloy side). Furthermore, as the thickness T1 of the soft layer becomes larger, the soft layer is less affected by the roughness at the interface, and therefore, the necessity to strictly manage the roughness at the interface can be reduced.

Further, it has been continued that more favorable resistance to a foreign matter is exhibited when the detection value of the oxygen amount at the interface of the soft layer and the resin overlay layer in GD-OES analysis is 0.3 V or less as in the invention according to claim 3. The detection value in GD-OES analysis being 0.3 V or less means that the oxygen amount at the interface of the soft layer and the resin overlay layer is relatively low. Accordingly, presence of the oxide at the interface is restrained, and therefore, it is conceivable that delamination of the resin overlay layer at the interface hardly occurs when the soft layer formed from a metallic material plastically deforms. Further, while in the invention according to claim 2, as the roughness at the interface of the soft layer and the resin overlay layer is made finer, the anchor effect that significantly affects the adhesive force of the resin overlay layer and the underlying alloy tends to be more difficult to obtain, it is conceivable that a stable adhesive force is easily obtained by specifying the oxygen amount at the interface of the soft layer and the resin overlay layer as in the invention according to claim 3.

Note that the resin overlay layer disclosed in each of Patent Literatures 1 and 2 is formed on the relatively hard metallic material such as an Al-base bearing alloy, or an Al—Sn alloy overlay having a Vickers' hardness of 40 to 100. Therefore, as compared with the resin overlay layer of the present invention, the layer under the resin overlay layer does not plastically deform significantly at the time of commingling of a foreign matter, and therefore, the technical idea of controlling the roughness and the oxygen amount at the interface of the resin overlay layer and the underlying alloy is never attained therefrom. On the contrary, in the present invention, it has been newly confirmed that controlling the roughness and the oxygen amount at the interface of the soft layer and the resin overlay layer is preferable as in the inventions according to claims 2 and 3.

Further, as a resin that composes the resin overlay layer in the present invention, a polyamide-imide resin (PAI), a polyamide resin (PA), a polybenzimidazole resin (PBI), a polyimide resin (PI), an epoxy resin (EP), a phenol resin (PF) and the like can be used. Further, as a solid lubricant that composes the resin overlay layer in the present invention, molybdenum disulfide, tungsten disulfide, boron nitride, graphite, polytetrafluoroethylene or the like can be used. Further, as a soft layer formed from the metallic material in the present invention, Pb, a Pb alloy, Sn, a Sn alloy, In, an In alloy, Bi, a Bi alloy or the like can be used. Note that hard particle of silicon nitride or the like, and a solid lubricant such as molybdenum disulfide may be added to the soft layer.

DESCRIPTION OF EMBODIMENT

Figure 1:
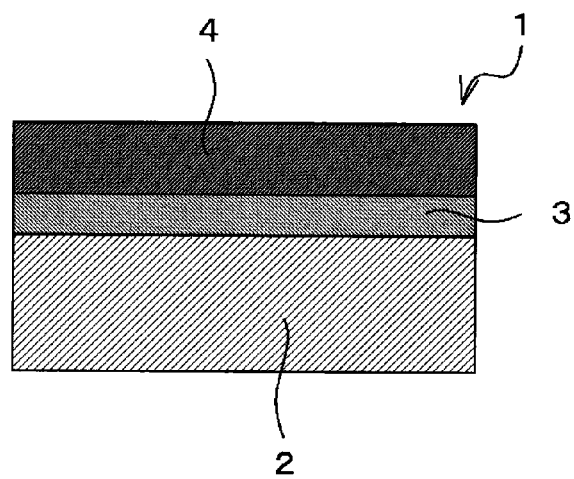
FIG. 1 is a schematic view showing a sliding member having a soft layer under a resin overlay layer.

Hereinafter, methods for producing examples 1 to 10 and comparative examples 1 to 6 each using a sliding member 1 having a soft layer 3 and a resin overlay layer 4 according to a present embodiment will be described. First, a so-called bimetal was produced by lining a Cu-base bearing alloy layer 2 on a steel backing (not illustrated). The bimetal was formed into a semi-cylindrical shape or a cylindrical shape, after which, boring was applied to a surface thereof to perform surface finishing. Thereafter, for the semi-cylindrical or cylindrical formed product, the soft layer 3 formed from a metallic material was formed with the composition shown in Table 1 by electroplating or the like. Further, on the soft layer 3, the resin overlay layer 4 formed from a solid lubricant and a resin was formed with the composition shown in Table 1. By the method as above, the sliding member 1 having the soft layer 3 formed from a metallic material under the resin overlay layer 4 formed from the solid lubricant and resin was produced as shown in FIG. 1.

TABLE 1

|  | No. | SOFT LAYER | RESIN LAYER |
|---|---|---|---|
| EXAMPLE | 1 | Pb—5 mass % Sn—7 mass % In | PAI—5 vol % PA—40 vol % MoS$_2$ |
|  | 2 | Bi | PAI—40 vol % MoS$_2$ |
|  | 3 | Pb—8 mass % Sn—1.5 mass % Cu | PAI—30 vol % MoS$_2$ |
|  | 4 | Bi—2 mass % Sn—2 mass % Cu | PAI—5 vol % PA—40 vol % MoS$_2$ |
|  | 5 | Pb—5 mass % Sn—7 mass % In | PAI—30 vol % MoS$_2$ |
|  | 6 | Sn | PF—40 vol % MoS$_2$ |
|  | 7 | Pb—5 mass % Sn—7 mass % In—1.0 vol % Si$_3$N$_4$ | PAI—40 vol % MoS$_2$ |
|  | 8 | Pb—5 mass % Sn—7 mass % In | PAI—5 vol % PA—40 vol % MoS$_2$ |
|  | 9 | Pb—5 mass % Sn—7 mass % In | PAI—5 vol % PA—40 vol % MoS$_2$ |
|  | 10 | Pb—5 mass % Sn—7 mass % In | PAI—5 vol % PA—40 vol % MoS$_2$ |
| COMPARATIVE EXAMPLE | 1 | Al—20 mass % Sn | PAI—30 vol % MoS$_2$ |
|  | 2 | — | PAI—5 vol % PA—40 vol % MoS$_2$ |

TABLE 1-continued

| No. | SOFT LAYER | RESIN LAYER |
|---|---|---|
| 3 | Pb—5 mass % Sn—7 mass % In | PAI—40 vol % $MoS_2$ |
| 4 | Pb—8 mass % Sn—1.5 mass % Cu | PAI—40 vol % $MoS_2$ |
| 5 | Pb—8 mass % Sn—1.5 mass % Cu | PAI—30 vol % $MoS_2$ |
| 6 | Pb—8 mass % Sn—1.5 mass % Cu | PAI—30 vol % $MoS_2$ |

Further, in the present embodiment, as a pretreatment process of formation of the resin overlay layer 4 on the soft layer 3, blasting was carried out to the soft layer 3, in order to ensure adhesiveness with the resin overlay layer 4. While in ordinary blasting, a relatively hard substance such as alumina is often used as abrasive grains, dry-ice blasting using $CO_2$ as abrasive grains was applied in the blasting of the present embodiment. Use of dry-ice blasting enables control of damage to the soft layer 3, and eliminates a fear of residual abrasive grains in the soft layer 3 as caused in the case of using alumina or the like as abrasive grains. Further, in dry-ice blasting, $CO_2$ is shot as the abrasive grains, and therefore, the residual oxygen amount on the surface of the soft layer 3 can be reduced. Further, as the method for optimizing blasting, a method which changes a shooting speed and a shooting amount of abrasive grains and the like can be raised, and in production of examples 1 to 10 and comparative examples 1 to 6, the roughness and the oxygen amount of the soft layer 3 is able to be controlled by performing blasting with a $CO_2$ shooting pressure of 4 to 7 bar and a $CO_2$ shooting amount of 20 to 40 kg/h.

Note that the method for producing the sliding member 1 may be other methods than the method described above, and as the pretreatment process of formation of the resin overlay layer 4 on the soft layer 3, grinding, etching, combustion frame irradiation processing, corona discharge treatment and the like may be applied, for example.

Next, with respect to the produced sliding member 1, a thickness T1 (μm) of the soft layer 3 and a thickness T2 (μm) of the resin overlay layer 4 were measured with use of a photograph of a section, and T1/T2 was calculated. Further, with respect to the produced sliding member 1, a Vickers' hardness was measured from a section of the soft layer 3 with use of a Vickers' hardness meter. The measurement results thereof are shown in Table 2.

Further, with respect to the produced sliding member 1, a bearing seizure test was carried out under the test conditions shown in Table 3 with use of a bearing test machine. The test result thereof is shown in Table 2. Note that during the test, the test was carried out with 4 mg of iron powder being injected from a lubricating oil supply port as a foreign matter, and the foreign matter being mixed into lubricating oil. Further, in the bearing seizure test, the time at which a back surface temperature (a temperature on the steel backing side) of the sliding member 1 exceeds 200° C., or a shaft driving belt slips due to torque variation was determined as seizure, and the pressure of a limit at which seizure does not take place is shown in Table 2.

TABLE 3

| BEARING SHAPE | φ150 × 22 mm WIDTH |
|---|---|
| SLIDING SPEED | 10 m/s |
| SHAFT MATERIAL | S55C |
| TEST LOAD | INCREASE BY 5 MPa EVERY 10 MINUTES |

Examples 1 to 7 each has the soft layer 3 with a hardness of less than 40 HV under the resin overlay layer 4, and the relationship of the thickness T1 (μm) of the soft layer 3 and the thickness T2 (μm) of the resin overlay layer 4 satisfies $0.2 \leq T1/T2 \leq 7.0$ and $3.0 \leq T1 \leq 20.0$, whereby all of examples 1 to 7 have favorable seizure resistance, as compared with comparative examples 1 to 6. This is because at the time of commingling of a foreign matter, the soft layer 3 under the resin overlay layer 4 plastically deforms while the resin overlay layer 4 partially deforms, the foreign matter is favorably embedded, and resistance to a foreign matter is improved while low friction of the resin overlay is utilized.

Comparative example 1 has a metal layer with a hardness of 40 HV or higher under the resin overlay layer 4 similarly to the disclosure of Patent Literature 2, and therefore, is inferior to examples 1 to 7 in seizure resistance. This is

TABLE 2

| | | SOFT LAYER | | RESIN LAYER | | SEIZURE SPECIFIC |
|---|---|---|---|---|---|---|
| | No. | HARDNESS (Hv) | THICKNESS T1 (μm) | THICKNESS T2 (μm) | T1/T2 | LOAD (MPa) |
| EXAMPLE | 1 | 10 | 15 | 3 | 5.0 | 90 |
| | 2 | 18 | 10 | 4 | 2.5 | 90 |
| | 3 | 12 | 3 | 1 | 3.0 | 90 |
| | 4 | 38 | 15 | 5 | 3.0 | 85 |
| | 5 | 10 | 4 | 12 | 0.3 | 85 |
| | 6 | 8 | 14 | 2 | 7.0 | 90 |
| | 7 | 10 | 20 | 4 | 5.0 | 90 |
| COMPARATIVE EXAMPLE | 1 | 70 | 20 | 6 | 3.3 | 65 |
| | 2 | — | — | 5 | — | 65 |
| | 3 | 10 | 25 | 5 | 5.0 | 70 |
| | 4 | 12 | 18 | 2 | 9.0 | 70 |
| | 5 | 12 | 2 | 1 | 2.0 | 70 |
| | 6 | 12 | 3 | 21 | 0.1 | 70 | because the hardness of the metal layer under the resin overlay layer 4 is relatively hard 70 HV, the metal layer is difficult to deform plastically at the time of commingling of a foreign matter, the foreign matter cannot be favorably embedded, and low friction of the resin overlay is not sufficiently utilized.

Next, with respect to each of examples 1 and 8 to 10, the roughness at the interface of the soft layer 3 and the resin overlay layer 4 was measured based on an interface profile based on the photograph of a section, and arithmetic mean roughness Ra (b) was calculated. The test result thereof is shown in Table 4. It has been confirmed that according to the measuring method, the result can be obtained, which is similar to that of the case of measuring the roughness of the soft layer 3 after carrying out dry blasting (before forming the resin overlay layer 4 on the soft layer 3) from the surface by a roughness meter.

layer 4 satisfies $0.2 \leq T1/T2 \leq 7.0$, and $3.0 \leq T1 \leq 20.0$. Meanwhile, in each of examples 8 to 10, the roughness Ra(b) at the interface of the soft layer 3 and the resin overlay layer 4, and the oxygen amount at the interface of the soft layer 3 and the resin overlay layer 4 are made to differ from the roughness Ra(b) and the oxygen amount of example 1.

In example 8, the detection value in the GD-OES analysis exceeds 0.3 V in the oxygen amount at the interface of the soft layer 3 and the resin overlay layer 4, but in the roughness Ra(b) at the interface of the soft layer 3 and the overlay layer 4, the relationship with the thickness T1 of the soft layer 3 satisfies $Ra(b) \leq T1 \times 0.06$, whereby example 8 has favorable seizure resistance as compared with example 1. This is because it is conceivable that in example 8, the

TABLE 4

|  |  | SOFT LAYER | | RESIN LAYER | | OXYGEN | SEIZURE SPECIFIC |
|---|---|---|---|---|---|---|---|
|  | No. | HARDNESS (Hv) | THICKNESS T1 (μm) | THICKNESS T2 (μm) | Ra (b) (μm) | AMOUNT (V) | LOAD (MPa) |
| EXAMPLE | 1 | 10 | 15 | 3 | 0.95 | 0.38 | 90 |
|  | 8 | 10 | 15 | 3 | 0.65 | 0.42 | 100 |
|  | 9 | 10 | 15 | 3 | 1.01 | 0.22 | 100 |
|  | 10 | 10 | 15 | 3 | 0.58 | 0.11 | 105 |

Figure 2:
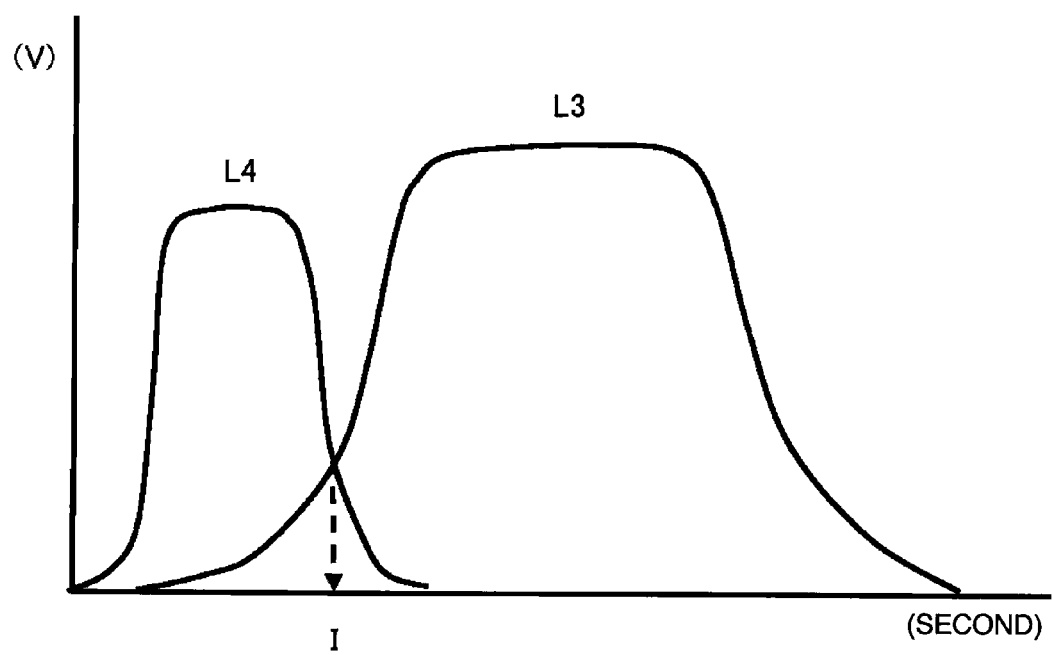
FIG. 2 is a diagram showing an example of a result of GD-OES analysis using the sliding member according to the present embodiment.

Further, with respect to each of examples 1 and 8 to 10, GD-OES analysis was carried out under the analysis conditions shown in Table 5 with use of an analyzer of JOBINY-VON GD-PROFILER 2 (Made by HORIBA), and the oxygen amount at the interface of the soft layer 3 and the resin overlay layer 4 was measured. The test result thereof is shown in Table 4. Further, as a specific example in GD-OES analysis, the analysis result with use of the composition of example 1 (the soft layer 3 of Pb-5 mass % Sn-7 mass % In and the resin overlay layer 4 of PAI-5 vol % PA-40 vol % $MoS_2$) is shown in FIG. 2. As schematically shown in FIG. 2, an axis of abscissa indicates a measurement time (second) and shows a depth from the surface at the sliding surface side of the sliding member 1, whereas an axis of ordinate indicates a measurement voltage (V) and shows concentration ratios of respective constituent elements of the soft layer 3 and the resin overlay layer 4 with respect to a depth direction. A position where analysis curves (an analysis curve showing Pb of the soft layer 3 is set as L3 and an analysis curve showing S of the resin overlay layer 4 is set as L4) of elements (Pb of the soft layer 3 and S of the resin overlay layer 4 in the present example) showing maximum peaks in the respective constituent elements of the soft layer 3 and the resin overlay layer 4 intersect each other is determined as an interface I of the soft layer 3 and the resin overlay layer 4, and the oxygen amount at the interface I is shown in Table 4.

TABLE 5

| PRESSURE | 600 Pa |
|---|---|
| OUTPUT | 35 W |
| PHASE | 4 V |
| MODULE | 8 V |
| PHOTOMULTIPLIER TUBE SENSITIVITY | O: 999 |
| MEASUREMENT DIAMETER | φ2 mm |

Note that each of examples 8 to 10 has the soft layer 3 with a hardness of less than 40 HV under the resin overlay layer 4, and the relationship of the thickness T1 (μm) of the soft layer 3 and the thickness T2 (μm) of the resin overlay roughness at the interface of the soft layer 3 and the resin overlay layer 4 is finer as compared with that of example 1, the resin overlay layer 4 hardly receives stress locally when the soft layer 3 formed from the metallic material plastically deforms, fracture of the resin overlay layer 4 is restrained, and favorable resistance to a foreign matter can be exhibited.

In example 9, in the roughness Ra(b) at the interface of the soft layer 3 and the resin overlay layer 4, the relationship with the thickness T1 of the soft layer 3 does not satisfy $Ra(b) \leq T1 \leq \times 0.06$, but in the oxygen amount at the interface of the soft layer 3 and the resin overlay layer 4, the detection value in the GD-OES analysis is 0.3 V or less, whereby example 9 has favorable seizure resistance as compared with example 1. This is because it is conceivable that since in example 9, the detection value in the GD-OES analysis is 0.3 V or less in the oxygen amount at the interface of the soft layer 3 and the resin overlay layer 4, the oxygen amount at the interface of the soft layer 3 and the resin overlay layer 4 is relatively small as compared with example 1, and when the soft layer 3 formed from the metallic material plastically deforms, delamination of the resin overlay layer 4 at the interface hardly occurs.

In example 10, in the roughness Ra(b) at the interface of the soft layer 3 and the resin overlay layer 4, the relationship with the thickness T1 of the soft layer 3 satisfies $Ra(b) \leq T1 \times 0.06$, and in the oxygen amount at the interface of the soft layer 3 and the resin overlay layer 4, the detection value in the GD-OES analysis is 0.3 V or less, whereby example 10 has especially favorable seizure resistance as compared with examples 1, 8 and 9.

Note that while in the present embodiment, the Cu-base bearing alloy layer 2 is used, it has been confirmed that in the case of using the Al-base bearing alloy layer 2, favorable seizure resistance is obtained similarly to examples 1 to 10, by having the soft layer 3 formed from a metallic material with a hardness of less than 40 HV under the resin overlay layer 4, and the relationship of the thickness T1 (μm) of the soft layer 3 and the thickness T2 (μm) of the resin overlay layer 4 satisfying $0.2 \leq T1/T2 \leq 7.0$, and $3.0 \leq T1 \leq 20.0$.

REFERENCE SIGNS LIST

1 SLIDING MEMBER
2 BEARING ALLOY LAYER
3 SOFT LAYER
4 RESIN OVERLAY LAYER

What is claimed is:

1. A sliding member, comprising:
a resin overlay layer containing a solid lubricant and a resin;
a soft layer containing a metallic material with a hardness of less than 40 HV under the resin overlay layer; and
a bimetal disposed under the soft layer, the bimetal including a steel backing and a Cu-base or Al-base bearing alloy lined thereon, wherein
a relationship between a thickness T1 (μm) of the soft layer and a thickness T2 (μm) of the resin overlay layer satisfies $0.2 \leq T1/T2 \leq 7.0$, and $3.0 \text{ μm} \leq T1 \leq 20.0 \text{ μm}$.

2. The sliding member according to claim 1, wherein a relationship between a roughness Ra(b) at an interface of the soft layer and the resin overlay layer, and the thickness T1 of the soft layer satisfies $Ra(b) \leq T1 \times 0.06$.

3. The sliding member according to claim 1, wherein a detection value of an oxygen amount at an interface of the soft layer and the resin overlay layer is 0.3 V or less, in Glow Discharge Optical Emission Spectrometry.

4. The sliding member according to claim 1, wherein the hardness of the soft layer is 20 HV or less.

* * * * *